US005617569A

United States Patent [19]
Gray et al.

[11] Patent Number: 5,617,569
[45] Date of Patent: *Apr. 1, 1997

[54] METHOD AND SYSTEM FOR IMPLEMENTING POINTERS TO MEMBERS IN A COMPILER FOR AN OBJECT-ORIENTED PROGRAMMING LANGUAGE

[75] Inventors: Jan Gray, Redmond; D. T. Jones, Preston, both of Wash.; Martin O'Riordan, Kildare, Ireland

[73] Assignee: Microsoft Corporation, Redmond, Wash.

[ * ] Notice: The term of this patent shall not extend beyond the expiration date of Pat. No. 5,432,936.

[21] Appl. No.: 419,980

[22] Filed: Apr. 10, 1995

Related U.S. Application Data

[63] Continuation of Ser. No. 866,785, Apr. 9, 1992, Pat. No. 5,432,936.
[51] Int. Cl.⁶ .................................................. G06F 17/30
[52] U.S. Cl. ................................ 395/614; 364/DIG. 1; 364/283.1; 395/705
[58] Field of Search ..................................... 395/600, 614, 395/700, 705; 364/DIG. 1, DIG. 2

[56] References Cited

U.S. PATENT DOCUMENTS

| | | | |
|---|---|---|---|
| 5,093,914 | 3/1992 | Coplien et al. | 395/700 |
| 5,129,083 | 7/1992 | Cutler et al. | 364/200 |
| 5,187,786 | 2/1993 | Densmore et al. | 364/200 |
| 5,206,951 | 4/1993 | Khuyi et al. | 364/200 |
| 5,295,256 | 3/1994 | Bapat | 395/500 |
| 5,297,279 | 3/1994 | Bannon et al. | 395/600 |
| 5,297,284 | 3/1994 | Jones et al. | 395/700 |
| 5,307,499 | 4/1994 | Yin | 395/700 |
| 5,361,351 | 11/1994 | Lenkov et al. | 395/700 |
| 5,371,891 | 12/1994 | Gray et al. | 395/700 |
| 5,432,936 | 7/1995 | Gray et al. | 395/700 |
| 5,481,708 | 1/1996 | Kukol | 395/700 |

OTHER PUBLICATIONS

USENIX C++ Conference Proceedings, USENIX Association, Washington, D.C., Apr. 22–25, 1991, pp. 1–11.
Ellis, Margaret A., and Bjarne Stroustrup, The Annotated C++ Reference Manual, Addison–Wesey Publishing Company, New York, 1990, pp. 155–161.

*Primary Examiner*—Thomas G. Black
*Assistant Examiner*—Maria N. Von Buhr
*Attorney, Agent, or Firm*—Seed and Berry LLP

[57] ABSTRACT

A method and system in an object-oriented environment for determining the offset of a data member of a derived class when the derived class has a virtually inherited base class and the data member is defined in the base class. In a preferred embodiment, the base class has a data structure and a class address. The base class data structure has the data member located at a data member offset from the base class address. The derived class has a data structure and a class address. The derived class data structure includes an occurrence of the base class data structure. The occurrence of the base class data structure is located at a base class offset from the derived class address. In a preferred embodiment, the base class offset is stored at a memory location, a first field and a second field for a pointer to the data member are allocated, the data member offset is stored in the first field, an indicator of the stored base class offset is stored in the second field, the pointer is dereferenced by retrieving the base class offset using the indicator stored in the second field, retrieving the data member offset from the first field, and adding the retrieved base class offset to the retrieved data member offset to give the offset of the data member within the derived data structure.

12 Claims, 8 Drawing Sheets

FIG.2
(Prior Art)

| 801 | 0 | 14 | ~802 |
|---|---|---|---|
| | 2 | D2::md21 | |
| | 4 | D2::md22 | |
| | 6 | V2::mv21 | |
| | 8 | V2::mv22 | |
| | 10 | W2::mw21 | |
| | 12 | W2::mw22 | |
| | 14 | −8 | ~803 |
| | 16 | A2::ma21 | |
| | 18 | A2::ma22 | |
| | 20 | −10 | ~804 |
| | 22 | B2::mb21 | |
| | 24 | B2::mb22 | |
| | 26 | C2::mc21 | |
| | 28 | C2::mc22 | |

*FIG. 8* piD23  902

| 2 |
|---|
| 4 | piD24  903

| 10 |
|---|
| 0 |

| 10 |
|---|
| −1 |

| 901 | 0 | 0 | ~905 |
|---|---|---|---|
| | 2 | 12 | ~906 |
| | 4 | 16 | ~907 |
| | 6 | 20 | ~908 |
| | 8 | D2::md21 | |
| | 10 | D2::md22 | |
| | 12 | V2::mv21 | |
| | 14 | V2::mv22 | |
| | 16 | W2::mw21 | |
| | 18 | W2::mw22 | |
| | 20 | 0 | |
| | 22 | −8 | |
| | 24 | A2::ma21 | |
| | 26 | A2::ma22 | |
| | 28 | 0 | |
| | 30 | −12 | |
| | 32 | B2::mb21 | |
| | 34 | B2::mb22 | |
| | 36 | C2::mc21 | |
| | 38 | C2::mc22 | |

*FIG. 9*

METHOD AND SYSTEM FOR IMPLEMENTING POINTERS TO MEMBERS IN A COMPILER FOR AN OBJECT-ORIENTED PROGRAMMING LANGUAGE

CROSS-REFERENCE TO RELATED APPLICATION

This application is a continuation of U.S. patent application Ser. No. 07/866,785, filed Apr. 9, 1992 now U.S. Pat. No. 5,432,936.

TECHNICAL FIELD

This invention relates generally to the field of compilers for computer programming languages and more specifically to compilers for languages having object-oriented features.

BACKGROUND OF THE INVENTION

The use of object-oriented programming techniques can facilitate the development of complex computer programs. Programming languages that support object-oriented techniques have been developed. One such programming language is C++.

Two common characteristics of object-oriented programming languages are support for data encapsulation and data type inheritance. Data encapsulation refers to the binding of functions and data. Inheritance refers to the ability to declare a data type in terms of other data types.

In the C++ language, object-oriented techniques are supported through the use of classes. A class is a user-defined type. A class declaration describes the data members and function members of the class. For example, the following declaration defines data members and a function member of a class named CIRCLE.

```
class CIRCLE
{   int x, y;
    int radius;
    void draw( );
};
```

Variables x and y specify the center location of a circle and variable radius specifies the radius of the circle. These variables are referred to as data members of the class CIRCLE. The function draw is a user-defined function that draws the circle of the specified radius at the specified location. The function draw is referred to as a function member of class CIRCLE. The data members and function members of a class are bound together in that the function operates on an instance of the class. An instance of a class is also called an object of the class.

In the syntax of C++, the following statement declares the objects a and b to be of type class CIRCLE.

CIRCLE a, b;

This declaration causes the allocation of memory for the objects a and b, such an allocation is called an instance of the class. The following statements assign data to the data members of objects a and b.

a.x=2;

a.y=2;

a.radius=1;

b.x=4;

b.y=5;

b.radius=2;

The following statements are used to draw the circles defined by objects a and b.

a.draw( );

b.draw( );

A derived class is a class that inherits the characteristics—data members and function members—of its base classes. For example, the following derived class CIRCLE_FILL inherits the characteristics of the base class CIRCLE.

```
class CIRCLE_FILL : CIRCLE
{   int pattern;
    void fill( );
};
```

This declaration specifies that class CIRCLE_FILL includes all the data and function members that are in class CIRCLE in addition to the those data and function members introduced in the declaration of class CIRCLE_FILL, that is, data member pattern and function member fill. In this example, class CIRCLE_FILL would have data members x, y, radius, and pattern and function members draw and fill. Class CIRCLE_FILL is said to "inherit" the characteristics of class CIRCLE. A class that inherits the characteristics of another class is a derived class (e.g., CIRCLE_FILL). A class that does not inherit the characteristics of another class is a primary class (e.g., CIRCLE). A class whose characteristics are inherited by another class is a base class (e.g., CIRCLE is a base class of CIRCLE_FILL). A derived class may inherit the characteristics of several classes, that is, a derived class may have several base classes. This is referred to as multiple inheritance.

A derived class may specify that a base class is to be inherited virtually. Virtual inheritance of a base class means that only one instance of the virtual base class exists in the derived class. For example, the following is an example of a derived class with two non-virtual base classes.

class CIRCLE_1 : CIRCLE { . . . };

class CIRCLE_2 : CIRCLE { . . . };

class PATTERN : CIRCLE_1, CIRCLE_2{ . . . };

In this declaration class PATTERN inherits class CIRCLE twice non-virtually through classes CIRCLE_1 and CIRCLE_2. There are two instances of class CIRCLE in class PATTERN.

The following is an example of a derived class with two virtual base classes.

class CIRCLE_1 : virtual CIRCLE { . . . };

class CIRCLE_2 : virtual CIRCLE { . . . };

class PATTERN: CIRCLE_1, CIRCLE_2{ . . . };

The derived class PATTERN inherits class CIRCLE twice virtually through classes CIRCLE_1 and CIRCLE_2. Since the class CIRCLE is virtually inherited twice, there is only one object of class CIRCLE in the derived class PATTERN. One skilled in the art would appreciate that virtual inheritance can be very useful when the class derivation is more complex.

A class may also specify whether its function members are virtual. Declaring that a function member is virtual means that the function can be overridden by a function of the same name and type in a derived class. In the following example, the function draw is declared to be virtual in classes CIRCLE and CIRCLE_FILL.

```
class CIRCLE
{   int x, y;
    int radius;
    virtual void draw( );
};
class CIRCLE_FILL : CIRCLE
{   int pattern;
    virtual void draw( );
};
```

The C++ language provides a pointer data type. A pointer holds values that are addresses of objects in memory. Through a pointer, an object can be referenced. The following statement declares variable c_ptr to be a pointer on an object of type class CIRCLE and sets variable c_ptr to hold the address of object c.

CIRCLE *c_ptr;

cptr=&c

Continuing with the example, the following statement declares object a to be of type class CIRCLE and object b to be of type class CIRCLE_FILL.

CIRCLE a;

CIRCLE_FILL b;

The following statement refers to the function draw as defined in class CIRCLE.

a.draw( );

Whereas, the following statement refers to the function draw defined in class CIRCLE_FILL.

b.draw( );

Moreover, the following statements type cast object b to an object of type class CIRCLE and invoke the function draw that is defined in class CIRCLE_FILL.

```
CIRCLE c;
CIRCLE *c_ptr;
c_ptr = &b;
c_ptr→draw( );        // CIRCLE_FILL::draw( )
```

Thus, the virtual function that is called is function CIRCLE_FILL::draw.

In addition to allowing pointers to objects of a class, the C++ language provides for pointers to function members or data members of a class. The following statement declares variable int_ptr to be a pointer to an integer data member of class CIRCLE.

int CIRCLE::*int_ptr;

The following statement sets pointer int_ptr to point to the integer data member y of class CIRCLE.

int_ptr=&CIRCLE::y;

In C++, a pointer to a member is bound to an object using the operator ".*" and to a pointer to an object using the operator "→*". The following statements declare objects c and d to be of type class CIRCLE and use pointers to data members to set the values of data members x and y.

CIRCLE c, d;

int_ptr=&CIRCLE::x;

c.*int_ptr=4;

d.*int_ptr=3;

int_ptr=&CIRCLE::y;

c.*int_ptr=5;

d.*int_ptr=2;

The above statements are logically equivalent to the following statements, which use a more direct approach to setting the values.

CIRCLE C, d;

c.x=4;

d.x=3;

c.y=5;

d.y=2;

The following statement defines variable f_ptr to be a pointer to a function member of class C with a return data type of void and no formal arguments.

void (CIRCLE::*f_ptr) ( );

The following statement sets pointer f_ptr to point to function draw of class CIRCLE.

f_ptr=&CIRCLE::draw;

The following statements invoke function draw for an instance of a class CIRCLE.

CIRCLE c;

(c.*f_ptr) ( );

The above statements are equivalent to the following statements.

CIRCLE c;

c.draw( );

SUMMARY OF THE INVENTION

It is an object of the present invention to provide a method and system for implementing pointers to data members and function members in a compiler for an object-oriented programming language.

It is another object of the present invention to provide a method and system for representing pointers to members wherein the pointers are bounded in space.

It is another object of the present invention to provide a method and system for implementing pointers to members of a derived class that inherits the member from a base class that is virtually inherited.

These and other objects of the invention, which will become more apparent as the invention is described more fully below, are obtained by providing a method in a computer system for determining the offset of a data member of a derived class when the derived class has a virtually inherited base class and the data member is defined in the base class. In a preferred embodiment, the base class has a data structure and a class address. The base class data structure has the data member located at a data member offset from the base class address. The derived class has a data structure and a class address. The derived class data structure includes an occurrence of the base class data structure. The occurrence of the base class data structure is located at a base class offset from the derived class address. In a preferred embodiment, the base class offset is stored at a memory location, a first field and a second field for a pointer to the data member are allocated, the data member offset is stored in the first field, an indicator of the stored base class offset is stored in the second field, the pointer is dereferenced by retrieving the base class offset using the indicator stored in the second field, retrieving the data member offset from the first field, and adding the retrieved base class offset to the retrieved data member offset to give the offset of the data member within the derived data structure.

BRIEF DESCRIPTION OF THE DRAWINGS

FIG. 2 illustrates data structures generated by a typical prior compiler representing pointers to members for sample classes A, B, and C.

FIG. 8 shows a schematic diagram of a data structure that does not use virtual base tables when a pointer is not bounded in space.

FIG. 9 shows a schematic diagram of a data structure that does not use virtual base tables when a pointer is bounded in space.

DETAILED DESCRIPTION OF THE INVENTION

Figure 1:
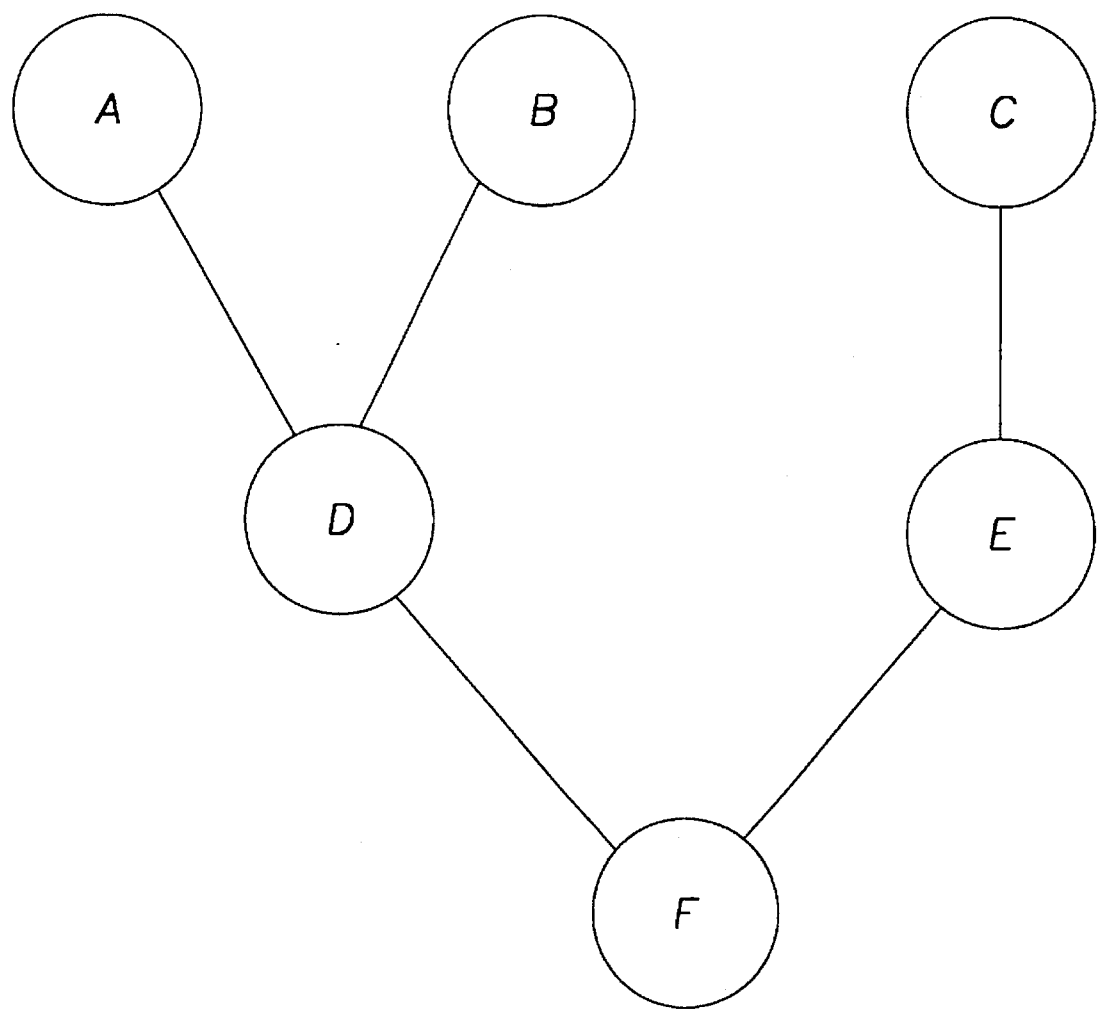
FIG. 1 shows the inheritance tree for class F.

The present invention provides an improved method and system for implementing pointers to data and function members in a compiler for an object-oriented programming language. A preferred embodiment of the present invention is a C++ compiler that implements pointers to members as described herein. Although the present invention is described in terms of a compiler for the C++ programming language, one skilled in the art would know that the methods of the present invention are applicable to other programming languages that support pointers to members. The present invention provides for a method of representing pointers to data and function members that corrects problems encountered in prior compilers.

In a preferred embodiment, the compiler defines a data structure for each class. If a class declares a base class to be virtual, then the compiler allocates a virtual base table for the class. If a class introduces a virtual function, then the compiler allocates a virtual function table for the class. The class data structure contains the layout of the data members and internal pointers. The internal pointers are virtual base table pointers and virtual function table pointers. These pointers are initialized during run time to point to the virtual base table and virtual function table associated with the class. During compile time, the compiler initializes the virtual function tables with pointers corresponding to virtual functions and initializes the virtual base tables with offsets into the class data structure corresponding to the location of virtually inherited classes.

In a preferred embodiment, the techniques for generating an object data structure layout are described in U.S. patent application Ser. No. 07/682,537, entitled "A Method for Implementing Virtual Functions and Virtual Bases in a Compiler for an Object-Oriented Programming Language," that issued as U.S. Pat. No. 5,297,284 on Mar. 22, 1994 and which is hereby incorporated by reference.

Class Data Structures

The compiler defines a data structure for each class. The data structure specifies the run-time storage allocation for each instance of the class. The data structure contains allocations for the data members of the class and for internal pointers used to implement virtual functions and virtual classes. The data structure for a derived class also contains the data structure for each base class. The data structure of a base class within a derived class is referred to as an occurrence of the base class within the derived class.

The class data structure for a primary class that has no virtual function members consists of the data members allocated in order of appearance in the class declaration. In a preferred embodiment, the data members in any data structure have the same alignment characteristics as the C++ struct data type.

The class data structure for a primary class that has a virtual function member consists of a virtual function table pointer followed by the data members allocated in order of appearance in the declaration.

The data structure for a derived class varies depending on the characteristics of the derived class and the base classes. In a preferred embodiment, the data structure for a derived class consists of:

(1) a virtual function table pointer, if the derived class defines a virtual function member that is not defined in a base class and if there is no non-virtual base class that has a virtual function table associated with it, (2) a virtual base table pointer, if there is a virtual base class and if there is no non-virtual base class that has a virtual base table pointer associated with that non-virtual base class, (3) an occurrence of each non-virtual base class in the left-to-right order specified in the list of base classes in the declaration, (4) the data members declared in the derived class allocated in order of appearance in the declaration, and (5) an occurrence of each virtual base class in the order as visited in a depth-first, left-to-right traversal of the inheritance tree (described below) of the derived class.

One skilled in the art would appreciate that the ordering of the components (2), (3), and (4) of a data structure can be interchanged.

A derived class is a direct descendant of the base classes listed in the declaration. Conversely, the base classes listed in the declaration are direct ancestors of a derived class. An inheritance tree is the ancestral relationship of the direct and indirect ancestors of a class. FIG. 1 shows the inheritance tree for class F. Class F and its ancestor classes are defined below.

class A{... };

class B{... };

class C{... };

class D: A, B{... };

class E: C {... };

class F: D, E{... };

Class F directly descends from base classes D and E and indirectly descends from classes A, B, and C. Classes A, B, C, D, and E are base classes of class F. Classes D and E are direct base classes of class F. Classes A, B, and C are indirect base classes of class F. A depth-first, left-to-right traversal of this inheritance tree would visit the nodes in the following order: F, D, A, B, E, C. One skilled in the art would recognize that this traversal is a preorder traversal of the inheritance tree defined by the following recursive procedure.

---
Preorder_Traversal(Tree)
begin
    visit root of Tree
    for each direct ancestor of Tree in left-
        to-right order
    SubTree = the tree rooted at the direct
        ancestor
    call Preorder_Traversal(SubTree)
end
---

Although preferred embodiments use a depth-first, left-to-right traversal of the inheritance tree, one skilled in the art would appreciate that other methods of traversing the inheritance tree may be used. Similarly, preferred embodiments scan the direct base class list in a left-to-right ordering. However, other orderings may be used.

Virtual Function Table

A virtual function table for a class contains addresses corresponding to the virtual function members associated with that class. The virtual function table is used at run time to invoke the virtual functions indirectly. Each primary class with a virtual function member has an associated virtual function table. The virtual function table contains the addresses of each virtual function member in order of declaration. The class data structure for such a class contains a virtual function table pointer (vfptr). When memory for a class data structure is allocated at run time (during construction), the virtual function table pointer is initialized with the address of the associated virtual function table. Thus, all objects of certain class type point to the same virtual function table. To implement the invoking of a virtual function, the compiler generates code to access the virtual function member through the virtual function table.

A derived class inherits a copy of the virtual function tables associated with its direct base classes. Also, a derived class that introduces a virtual function member either has an additional virtual function table or shares one of the inherited virtual function tables. A class is said to "introduce" a virtual function member if there are no other virtual function members of the same name and type in a base class. Such a derived class shares the virtual function table with the first non-virtual base class with an associated virtual function table that is visited in a depth-first, left-to-right traversal of the inheritance tree, if such a base class exists. Otherwise, the derived class has its own virtual function table. The derived class shares a virtual function table by appending the entries for the function members introduced in the derived class to the shared virtual function table.

In a preferred embodiment, the compiler generates code to invoke virtual functions indirectly through the virtual function table associated with the invoking object.

Virtual Base Tables

A virtual base table contains, for each virtual direct base class, the offset between the address of the derived class and the address of the occurrence of the virtual direct base class in the derived class. The address of a class is described below. The virtual base tables are used at run time to access the occurrences of the virtual base classes.

The data structure for a derived class with an associated virtual direct base class includes a virtual base table pointer. Such a derived class shares the virtual base table pointer with the first non-virtual base class with an associated virtual base table that is visited in a depth-first, left-to-right traversal of the inheritance tree, if such a base class exists. The sharing of a virtual base table pointer means that the derived class and the base class share the same virtual base table. When a virtual base table is shared, the virtual base table is extended to include the offsets of the occurrences for the virtual direct base classes in the derived class that are not inherited by the base class whose virtual base table pointer is being shared. All functions that access the data members of a virtual base class access the data member through a virtual base table.

The entries in a virtual base table are ordered according to a left-to-right ordering of the virtual base classes in the declaration of the derived class.

Class Address

The address of an instance of a class is the address of the virtual function table pointer, if the class has one or shares one. Otherwise, the address of an instance of a class is the address of the virtual base table pointer, if the class has one or shares one. Otherwise, the address of an instance of a class is the address of the occurrence of the left-most non-virtual direct base class in the declaration, if there is such a base class. Otherwise, the address of an instance of a class is the address of the first data member in the class.

This Pointer

In the C++ language, the "this" pointer points to the object for which a function is called. The word "this" is a reserved word in the C++ language. In a preferred embodiment, the this pointer is passed to the function as hidden argument.

For non-virtual function members, the this pointer is the address of the object associated with the call.

For virtual function members, the this pointer is the address of the occurrence of the introducing class in the object associated with the call. A function defined in the introducing class expects that it is passed such a this pointer value. If the function is overridden, the overriding function may logically adjust the this pointer by the offset between the address of the object and the address of the occurrence of the introducing class within the object. This logical adjustment allows the overriding function to access the entire object of the class in which the overriding function is declared. In a preferred embodiment, explicit adjustment of the address may not be necessary because the offset can usually be incorporated into another computation or address formation.

Because an overriding function can be shared by many occurrences of a class or many different classes, there are two cases in which the this pointer needs to be adjusted before a function is invoked. In these cases, adjustor routines (i.e., thunks) are used to adjust the this pointer value before the function is invoked.

The first case occurs when a function member in a derived class overrides a function member that is defined in more than one base class, including when a class that defines the function occurs more than once in the inheritance tree. In this case, the overriding function is compiled expecting that the this pointer is set to the address of the "introducing class." The "introducing class" for a function is the first class visited in a depth-first, left-to-right traversal of the inheritance tree that introduces the function. For each class, except the introducing class, in which the function is overridden, an adjustor is created. The adjustor modifies the this pointer and then invokes the overriding function. The adjustor modifies the this pointer by the offset between the address of the occurrence of the introducing class and the address of the occurrence of the class for which the function is invoked. To override the address of the virtual function, the address of the adjustor is placed in the virtual function table corresponding to the occurrence of the class in which the function is defined. Thus, when the overriding function is invoked for an occurrence of a class for which an adjustor is created, the compiled program retrieves the address of the adjustor from the virtual function table and calls the adjustor. The adjustor then adjusts the this pointer and jumps to the overriding function. The virtual function table of the occurrence of the introducing class within the derived class contains the address of the overriding function, no adjustor is needed.

The second case occurs when a derived class has a base class that overrides a function member in a virtual base class and the derived class itself does not override the function member. In this case, the overriding function is compiled to expect the this pointer to be set to the address of the introducing class, the virtual class. To access an object for the class that virtually inherits the introducing class, the overriding function logically adjusts the this pointer by the offset of the occurrence of the introducing class and the address of the object. For the class that virtually inherits the introducing class, the address of the overriding function is placed in the virtual function table associated with the virtually inherited class. However, when such a class is itself used as a base class, the offset between occurrence of the virtual base class and the occurrence of the base class in the derived class may be different than the offset that the overriding function expects. In such case, an adjustor is used for the overriding function. The adjustor adjusts the this pointer to account for the difference between the offsets. The address of the adjustor is placed in the virtual function table associated with occurrence of the virtual class in the derived class. Thus, when the overriding function is called for an object of the derived class, the adjustor is invoked. The adjustor adjusts the this pointer by the difference in the offsets so that the overriding function correctly computes the address of the introducing class. The adjustor then invokes the overriding function.

Pointers to Members

Prior C++ compilers represent pointers to data members of classes as the offset of the data member within an instance of the class and pointers to function members of classes as the offset within an instance of the class of the this pointer and a pointer to the function member.

Figure 2:
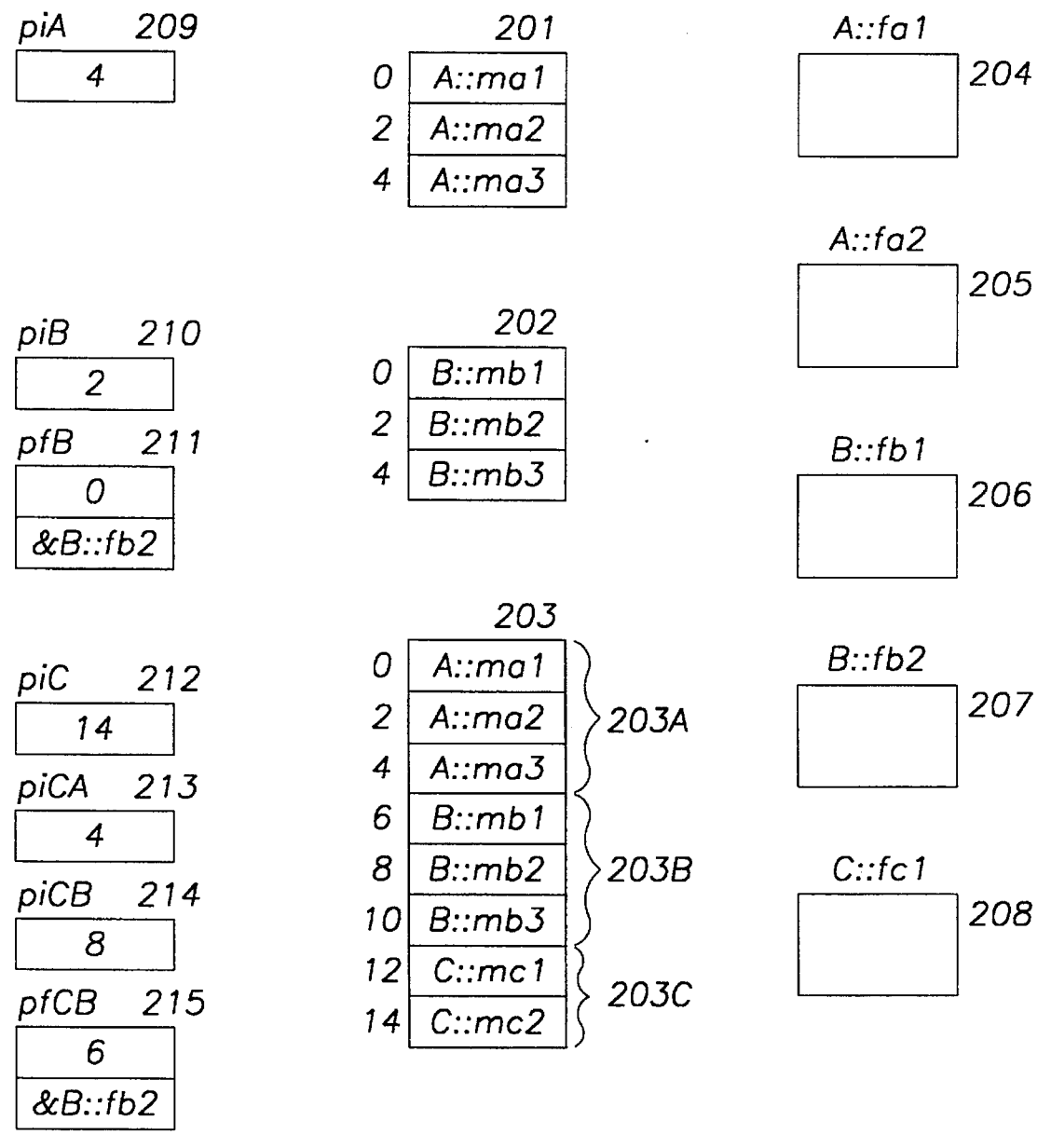

FIG. 2 illustrates data structures generated by a typical prior compiler representing pointers to members for sample classes A, B, and C. Classes A and B defined below are primary classes each having 3 integer data members and 2 integer function members.

```
class A
    {   int   ma1;
        int   ma2;
        int   ma3;
        int   fa1( );
        int   fa2( );
    };
class B
    {   int   mb1;
        int   mb2;
        int   mb3;
        int   fb1( );
        int   fb2( );
    };
```

FIG. 2 shows a schematic diagram of the data structures and 202 for classes A and B, respectively, and function members A::fa1 204, A::fa2 205, B::fb1 206, and B::fb2 207 of class A and B. Class C defined below is a derived class that inherits base classes A and B and has 2 data members and 1 function member.

```
class C : A, B
    {   int   mc1;
        int   mc2;
        int   fc1( );
    };
```

FIG. 2 shows a schematic diagram of the data structure 203 and function member C::fc1 208 for class C. Data structure 203 includes an occurrence of class A 203A, an occurrence of class B 203B, and the data members of class C 203C.

The following C++ statements declare variables piA, piB, piC, piCA, piCB, pfB, and pfCB as pointers to members of classes.

int A::*piA=&A::ma3;

int B::*piB=&B::mb2;

int C::*piC=&C::mc2;

int C::*piCA=&C::ma3;

int C::*piCB=&C::mb2;

int (B::*pfB) ( )=&B::fb2;

int (C::*pfCB)( )=&C::fb2;

Prior compilers represent pointers to data members as the offset of the data member within the class data structure. For example, pointer piA is declared as a pointer to an integer data member of class A and is initialized to point to data member A::ma3, which is at offset 4 within data structure 201 for class A. Data structure 209 represents pointer piA and contains the offset 4. Pointer piB is declared as a pointer to an integer data member of class B and is initialized to point to data member B::mb2, which is at offset 2 within data structure 202 for class B. Data structure 210 represents pointer piB and contains the offset 2. Pointer piC is declared as a pointer to an integer data member of class C and is initialized to point to data member C::mc2, which is at offset 14 within data structure 203 for class C. Data structure 212 represents pointer piC and contains the offset 14. Pointer piCA is declared as a pointer to an integer data member of class C and is initialized to point to data member C::ma3, which is at offset 4 within data structure 203 for class C. Data structure 213 represents pointer piCA and contains offset 4. Pointer piCB is declared as a pointer to an integer data member of class C and is initialized to point to data member C::mb2, which is at offset 8 within data structure 203 for class C. Data structure 214 represents pointer piCB and contains offset 8.

Prior compilers represent pointers to function members by the offset for the this pointer within the class and by a pointer to the function. For example, pointer pfB is declared as a pointer to a function member of class B and is initialized with the offset for the this pointer for function B::fb2 and with the address of function member B::fb2. Data structure 211 represents pointer pfB and contains offset 0 (field1) and the address of function member B::fb2 (field2). Pointer pfCB is declared as a pointer to a function member of class C and is initialized with offset for the this pointer for function B::fb2, which expects a this pointer that points to an occurrence of an object of type class B, and with the address of function member B::fb2. Data structure 215 represents pointer pfcB which contains offset 6 and the address of function member B::fb2.

To dereference pointers to data members, prior compilers add the offset in the pointer to the address of the object to give the address of the data member. The following statements declare object a to be of type class A and set data member A::ma3 to 0.

A a;

*a.\*piA*=0;

If object a is stored at location 100, then memory location 104 (&a+piA) is set to 0.

To dereference pointers to function members, prior compilers add the offset in the pointer to the address of the object for which the function member is invoked, and passes that sum as the this pointer when invoking the function through the address in the pointer. The following statements declare object c to be of type class C and invoke function member B::fb2 for object c.

C c;

(c.\*pfCB) ( );

If object c is stored at location 110, then the statements set the this pointer to 116 (&c+pfCB.field1), which points to the occurrence of class B within object c, before invoking function member B::fb2.

Figure 3:
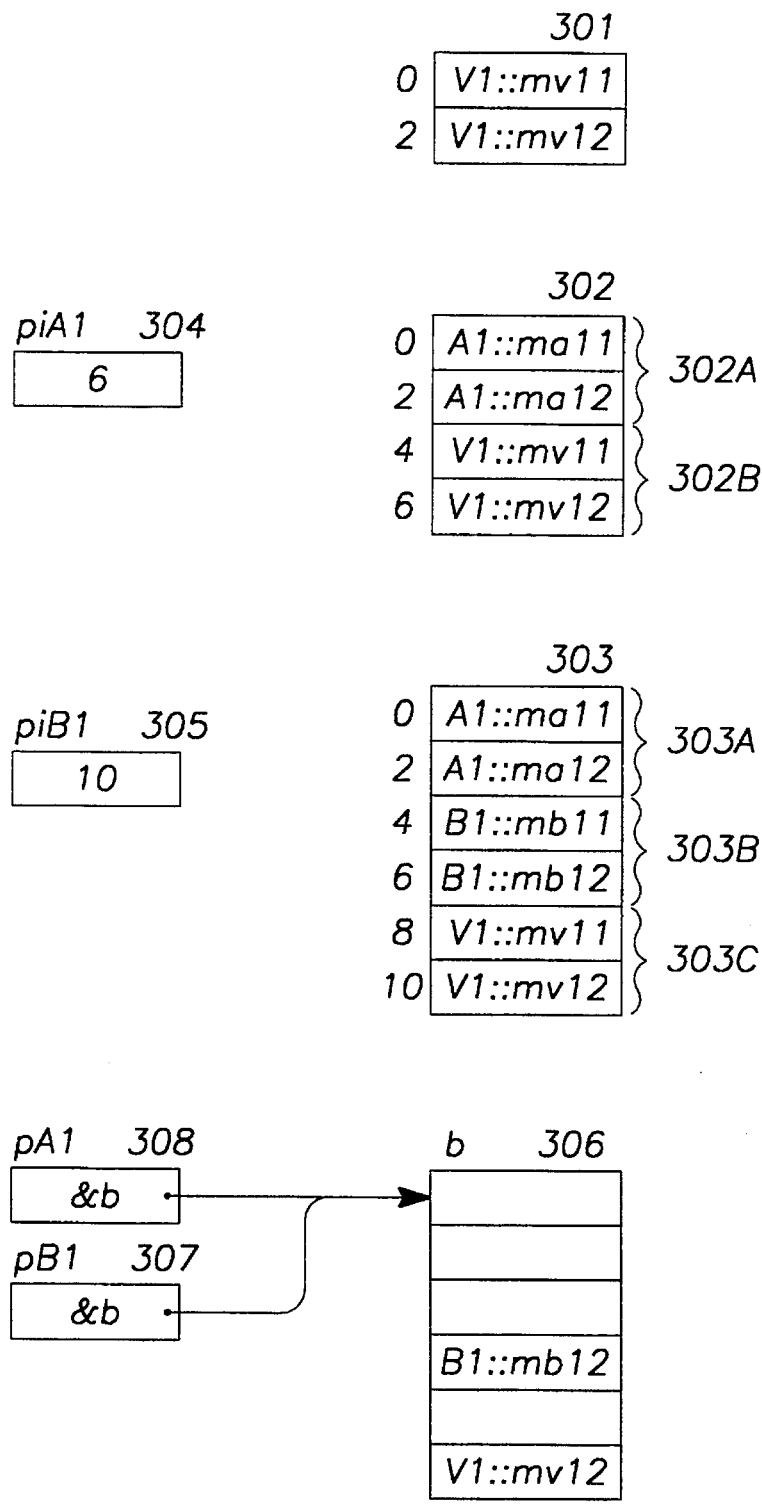
FIG. 3 illustrates data structures generated by a typical prior compiler in which pointers to members are incorrectly implemented.

Using the above-described representations for pointers to members, prior compilers generate code that does not correctly access members through pointers to members when derived classes virtually inherit base classes. FIG. 3 illustrates data structures for a typical prior compiler in which pointers to members are incorrectly implemented. Classes V1, A1, and B1 defined below are used to show the problem with prior compilers. Class V1 is a primary class with 2 data members and 1 function member. Class A1 is a derived class that virtually inherits class V1 and has 2 data members and 1 function member. Class B1 is a derived class that inherits class A1 and has 2 data members and 1 function member.

```
class V1
    {   int  mv11;
        int  mv12;
        int  fv11( );
    };
class A1 : virtual V1
    {   int  ma11;
        int  ma12;
        int  fa11( );
    };
class B1 : A1
    {   int  mb11;
        int  mb12;
        int  fb11( );
    }
```

FIG. 3 shows a schematic diagram of the data structures 301, 302, and 303 for classes V1, A1, and B1, respectively. Data structure 302 contains the data members 302A declared in class A1 and the data members B virtually inherited from class V1. Data structure contains the data members 303A inherited from class A1, the data members 303B declared in class B1, and the data members 303C virtually inherited from class V1. The following statements declare the variables piA1, piB1, pa1, pB1, b, c, and d.

| | |
|---|---|
| int A1::\*piA1=&A1::mv12; | (1) |
| int B1::\*piB1=&B1::mv12; | (2) |
| int c, d; | (3) |
| A \*pA1; | (4) |
| B \*pB1, b; | (5) |

In statement (1), pointer piA1 is declared as a pointer to an integer data member of class A1 and is initialized to point to data member A1::mv12, which is at offset 6 within data structure 302 for class A. Data structure 304 represents pointer piA1 and contains offset 6. In statement (2), pointer piB1 is declared as a pointer to an integer data member of class B1 and is initialized to point to data member B1::mv12, which is at offset 10 within data structure 303 of class B1. Data structure 305 represents pointer piB1 and contains offset 10. In statement (3), variables c and d are declared to be integers. In statement (4), pointer pa1 is declared to point to an object of class A1. Data structure 308 represents pointer pa1. In statement (5), pointer pB1 is declared to point to an object of class B1. Data structure 307 represents pointer pB1. Also in statement (5), object b, represented by data structure 306, is declared to be of type class B1. The following statements illustrate that these methods of prior compilers are inadequate to correctly implement pointers to members.

| | |
|---|---|
| pB1=&b; | (6) |
| pa1=pB1; | (7) |
| c=pB1→\*piB1; | (8) |
| d=pA1→\*piA1; | (9) |

In statement (6), pointer pB1 is set to point to the address of object b. In statement (7), pointer pa1 is set to point to an object of class A1 that is type cast from object b. In statement (8), integer c is set to the value in the data member of object b that is pointed to by pointer piB1. Thus, integer c contains the value stored at offset 10 within object b, which is V1::mv12 as required by the C++ language. The dereferencing of pointer piB1 is represented by the following statement.

$$c=*(pB1+piB1);$$

In statement (9), integer d is set to the value in the data member of an object of class A1 that is pointed to by pointer piA1. Thus, integer d contains the value stored at offset 6 within object b, which is B1::mb12. This dereferencing is represented by the following statement.

$$d=*(pA1+piA1);$$

This, however, is incorrect. Integer d should be set to the value in V1::mv12. Thus, prior compilers do not correctly implement pointers to data members when bases are virtually inherited. Similarly, prior compilers do not correctly calculate the this pointer for functions invoked through a pointer to a function member for a class that virtually inherits a base class.

Pointers to Data Members

The present invention provides a method and system for correctly implementing pointers to members when bases are virtually inherited. In a preferred embodiment, the present invention represents a pointer to a data member of a derived class that virtually inherits a base class by the offset of the data member within the class that introduces the data member and a specifier of the offset of the occurrence of the introducing class within the derived class. In a preferred embodiment, this representation uses the following three fields:

| | |
|---|---|
| mdisp | offset of the data member within the class that introduces the data member |
| pdisp | offset of the pointer to the virtual base table within the derived class |
| vdisp | offset of the entry in the virtual base table that contains the offset of the occurrence of the introducing class within the derived class |

Fields pdisp and vdisp compose the specifier of the offset of the occurrence of the introducing class within the derived class.

Figure 4:
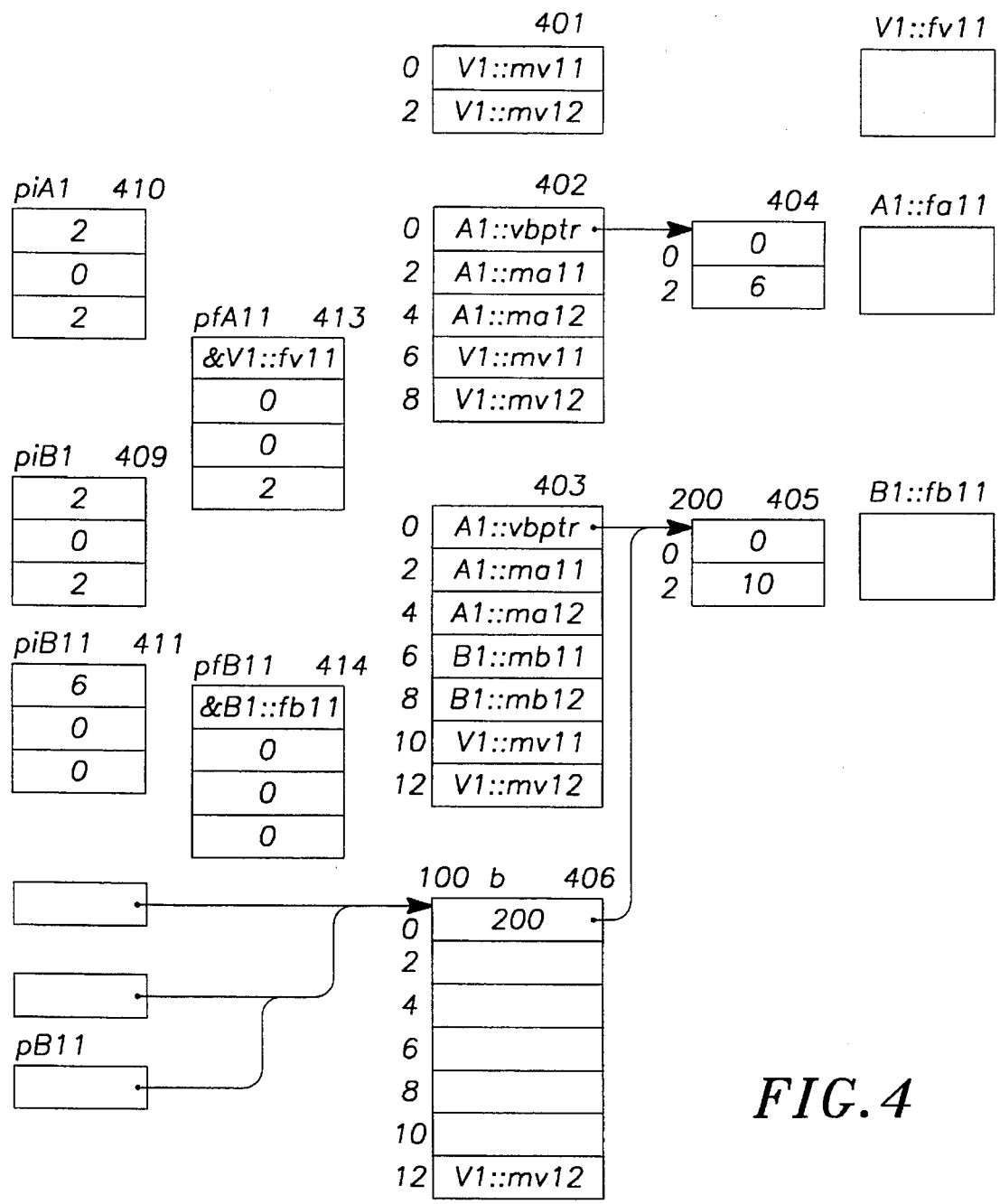
FIG. 4 shows a schematic diagram of the data structures for classes V1, A1, and B1 in a preferred embodiment.

Continuing with the above example using classes V1, A1, and B1, FIG. 4 shows a schematic diagram of the data structure 401, 402, and 403 for classes V1, A1, and B1, respectively, in a preferred embodiment. Data structure 402 for class A1 contains a virtual base table pointer A1::vbptr, data members A1::ma11 and A1::ma12 defined in class A1, and an occurrence of class V1. Virtual base table pointer A1::vbptr points to virtual base table 404 of class A1. Virtual base table 404 contains a 0 as the first entry and the offset of the occurrence of class V1 within class A1 in the second entry. Data structure 403 for class B1 contains the virtual base table pointer A1::vbptr, the data members A1::ma11 and A1::ma12 of class A1, the data members B1::mb11 and B1::mb12 of class B1, and an occurrence of class V1. Virtual base table pointer A1::vbptr points to virtual base table 405. Virtual base table 405 contains a 0 in the first entry and the offset of the occurrence of class V1 within the class B1 in the second entry.

Referring again to statements (1)–(9) above, in statement (1), the compiler allocates data structure 410 containing three fields (mdisp, pdisp, and vdisp) for pointer piA1 and sets field mdisp to 2, field pdisp to 0, and field vdisp to 2. The field mdisp contains the offset of data member V1::mv12 within class V1. The field pdisp contains the offset of the virtual base table pointer A1::vbptr within class A1. The field vdisp contains the offset of the entry in the virtual base table 404 that contains the offset of the occurrence of the class V1 within class A1.

In statement (2), the compiler allocates data structure 409 pointer piB1 and sets field mdisp to 2, field pdisp to 0, and field vdisp to 2. The field mdisp contains the offset of data member V1::mv12 within class V1. The field pdisp contains the offset of the virtual base table pointer A1::vbptr within class B1. The field vdisp contains the offset of the entry in the virtual base table 405 that contains the offset of the occurrence of the class V1 within class B1.

In statement (3), variables c and d are declared to be integers. In statement (4), pointer pa1 is declared to point to an object of class A1. In statement (5), pointer pB1 is declared to point to an object of class B1, and object b is declared to be of type class B1.

In statement (6), pointer pB1 is set to the address of object b. In statement (7), pointer pa1 is set to point to the occurrence of class A1 within object b.

In statement (8), integer c is set to the value of data member V1::mv12 of object b that is pointed to by pointer pB1. In a preferred embodiment, statement (8) is logically equivalent to the following statement.

$$c=*(\&b+*(*(\&b+piB1.pdisp)+piB1.vdisp)+piB1.mdisp)$$

This statement performs the following steps.

1. The value in piB1.pdisp is added to the address of object b to give the address of virtual base pointer A1::vbptr.
2. The value in piB1.vdisp, 2, is added to the contents of the virtual base pointer A1::vbptr within object b to give the address of the virtual base table entry that contains the offset of the occurrence of class V1 within class B1.
3. The address of object b is summed with the contents of the virtual base table entry and the value in piB1.mdisp to give the address of the data member V1::mv12 within object b.
4. The value in data member V1::mv12 is then stored in integer c.

In statement (9), integer d is set to the value of data member V1::mv12 of object b that is pointed to by pointer pa1. In a preferred embodiment, statement (9) is logically equivalent to the following statement, where &a is the address of the occurrence of the class A1 within object b.

$$d=*(\&a+*(*(\&a+piA1.pdisp)+piA1.vdisp)+piA1.mdisp)$$

This statement performs the following steps.

1. The value in piA1.pdisp is added to the address of the occurrence of class A1 within object b to give the address of virtual base pointer A1::vbptr.
2. The value in piA1.vdisp, 2, is added to the contents of the virtual base pointer A1::vbptr within the occurrence of class A1 within object b to give the address of virtual base table entry that contains the offset of the occurrence of class V1 within class B1.
3. The address of the occurrence of class A1 within object b is summed with the contents of the virtual base table entry and the value in piA1.mdisp to give the address of the data member V1::mv12 within object b.
4. The value in data member V1::mv12 is then stored in integer d.

As illustrated by the above example, the methods of the present invention correctly set integer d to the contents of data member V1::mv12.

The methods of the present invention also provide for pointers to members that are not declared in virtually inherited classes. It is preferred that each virtual base table include an entry with a zero value. This zero value represents the offset of the occurrence of the derived class within the derived class, which is 0. When a pointer to a data member that is not virtually inherited is initialized, its vdisp field indicates the entry with the zero value. Thus, when the pointer is dereferenced, the address of the data member is effectively formed by the address of the object plus the value in field mdisp. This entry in the virtual base table is referred to as the derived class offset. Alternatively, a special vdisp or pdisp value could be used to indicate that no virtual base table look up is needed for a data member that is not virtually inherited.

Continuing with the above example, the following statement declares pointer piB11 to point to an integer member of class B1 and initializes the pointer piB11 to point to data member B1::mb11.

```
int B1::*piB11=&B1::mb11;
```

Data structure 411 represents pointer piB11 and contains the field mdisp equal to 8, the field pdisp equal to 0, and the field vdisp equal to 0. The following statement assigns the value in data member B1::mb11 of object b to integer d.

```
d=pB1→*piB11;
```

Since the field vdisp of pointer piB11 indicates a zero offset into the virtual base table, the derived class offset is used when dereferencing the pointer.

The following example further illustrates the methods of the present invention. Classes V2, W2, A2, B2, and C2 are defined in the following. Classes V2 and W2 are primary classes with two data member each. Class A2 virtually inherits class V2 and defines 2 data members. Class B2 virtually inherits class W2 and defines 2 data member. Class C2 inherits classes A2 and B2 and defines 2 data members.

```
class V2
    {   int   mv21;
        int   mv22;
    };
class W2
    {   int   mw21;
        int   mw22;
    };
class A2 : virtual V2
    {   int   ma21;
        int   ma22;
    };
class B2 : virtual W2
    {   int   mb21;
        int   mb22;
    };
class C2 : A2, B2
    {   int   mc21;
        int   mc22;
    };
```

Figure 5:
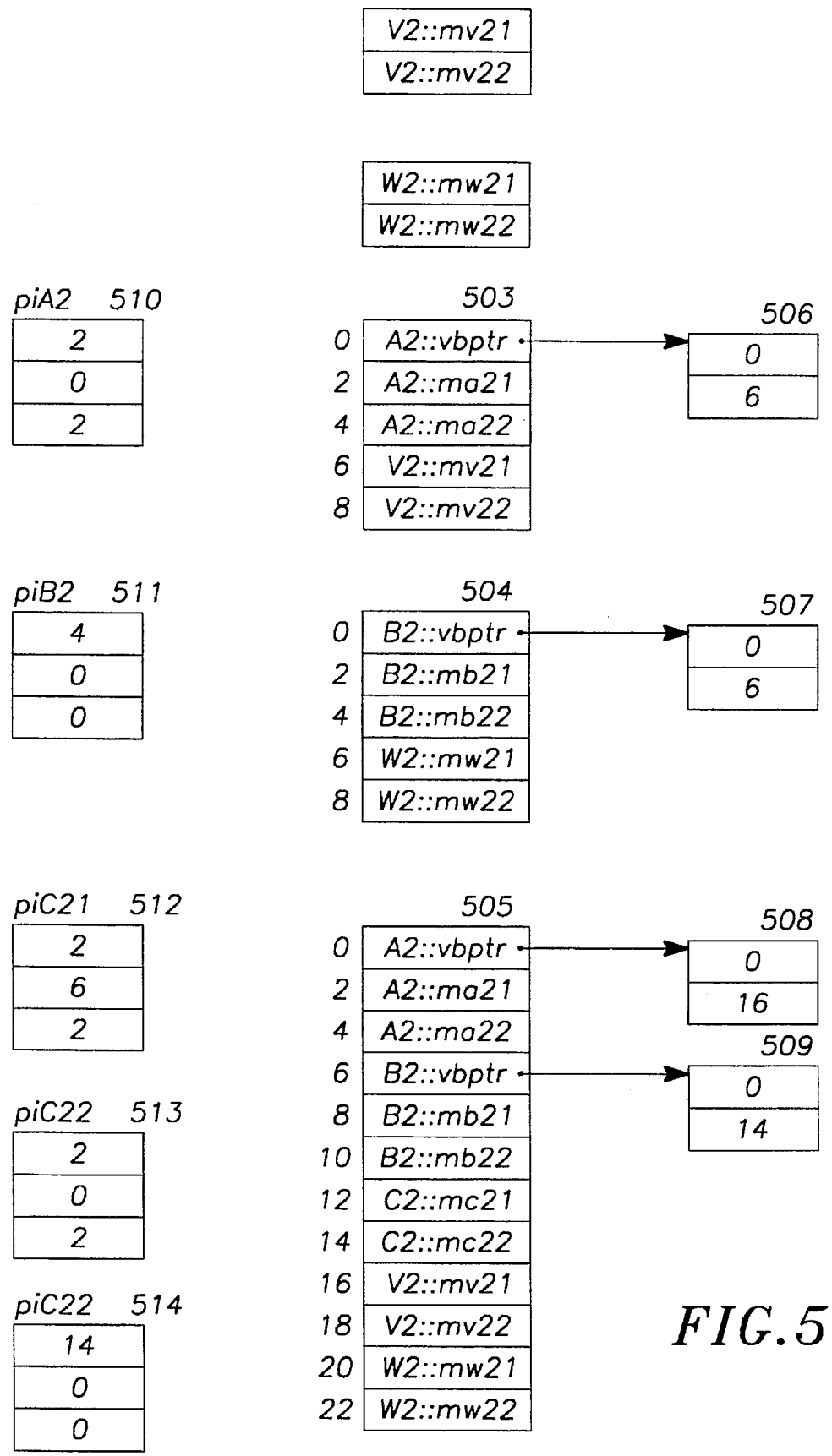
FIG. 5 is a schematic diagram of the data structures for classes V2, W2, A2, B2, and C2 in a preferred embodiment.

FIG. 5 is a schematic diagram of the data structures for classes V2, W2, A2, B2, and C2 in a preferred embodiment. Data structure 503 for class A2 contains virtual base table pointer A2::vbptr to virtual base table 506, the data members of class A2, and an occurrence of class V2, which is virtually inherited. Virtual base table 506 contains two entries. The first entry contains the derived class offset, and the second entry contains a 6, which is the offset of the occurrence of class V2 within class A2. Data structure 504 for class B2 contains virtual base table pointer B2::vbptr to virtual base table 507, the data members of class B2, and an occurrence of class W2, which is virtually inherited. Virtual base table 507 contains two entries. The first entry contains the derived class offset, and the second entry contains a 6, which is the offset of the occurrence of class W2 within class B2. Data structure 505 for class C2 contains an occurrence of class A2, which includes virtual base table pointer A2::vbptr to virtual base table 508 and the data members of class A2; an occurrence of class B2, which includes virtual base table pointer B2::vbptr to virtual base table 509 and the data member of class B2; the data members of class C2; an occurrence of class V2, which includes the data members of class V2; and an occurrence of class W2, which includes the data members of class W2. Virtual base table 508 contains two entries. The first entry contains the derived class offset, and the second entry contains the offset of the occurrence of class V2 within class C2 relative to class A2. Virtual base table 509 contains two entries. The first entry contains the derived class offset, and the second entry contains the offset of the occurrence of class W2 within class C2 relative to class B2.

Pointers piA2, piB2, piC21, piC22, and piC23 are declared and initialized by the following statements.

```
int A2::*piA2=&A2::mv22;

int B2::*piB2=&B2::mb22;

int C2::*piC21=&C2::mw22;

int C2::*piC22=&C2::mv22;

int C2::*piC23=&C2::mc22;
```

As shown in FIG. 5, data structure 510 for pointer piA2 is initialized to (2, 0, 2), data structure 511 for pointer piB2 is initialized to (4, 0, 0), data structure 512 for pointer piC21 is initialized to (2, 6, 2), data structure 513 for pointer piC22 is initialized to (2, 0, 2), and data structure 514 for pointer piC23 is initialized to (14, 0, 0), where the first elements represent the value in field mdisp, the second element represents the value in field pdisp, and the third element represents the value in field vdisp. When pointer piC21 is used to access member C2::mw22, the dereferencing uses B2::vbptr and virtual base table 409, which is indicated by the offset of 6 in field pdisp.

The present invention also provides for the dereferencing of pointers to members of a derived class that virtually inherits a base class which has a virtually inherited base class. There is no constant offset between the derived class and the occurrence of the base class it virtually inherits or between the virtually inherited base class and the base class it virtually inherits. The following example illustrates this situation. Class D2 virtually inherits class C2, which virtually inherits classes V2 and W2.

```
class D2 : virtual C2
    {   int   md21;
        int   md22;
    };
```

Figure 6:
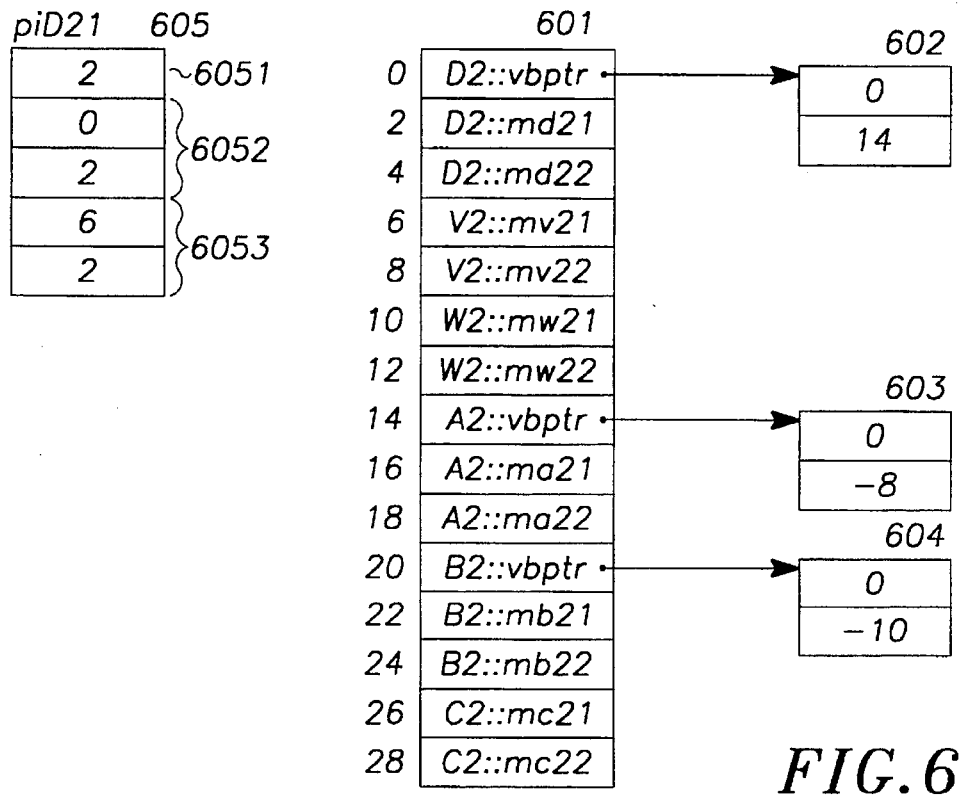
FIG. 6 is a schematic diagram of the data structure for a derived class that virtually inherits a base class that has a virtually inherited base class when a pointer is not bounded in space.

FIG. 6 is a schematic diagram of data structure for a derived class that virtually inherits a base class that has a virtually inherited base class. Data structure 601 contains a virtual base table pointer D2::vbptr for class D2, which points to virtual base table 602; the data members for class D2; an occurrence of class V2; an occurrence of class W2; and an occurrence of class C2. The occurrence of class C2 includes an occurrence of class A2, which include virtual base table pointer A2::vbptr that points to virtual base table 603 and the data member of class A2; an occurrence of class B2, which includes virtual base table pointer B2::vbptr that points to virtual base table 604 and the data member of class B2; and the data members of class C2. The virtual function table 602 contains offset of the derived class and the offset of the occurrence of class A2 within class D2. The virtual function table 603 contains the offset of the derived class and the offset of the occurrence of class V2 from the occurrence of class A2 within class D2. The virtual function table 604 contains the offset of the derived class and the offset of the occurrence of class W2 from the occurrence of class B2 within class D2.

Pointer piD21 is declared to be a pointer to an integer data member of class D2 and initialized to point to data member D2::mw22 in the following statement.

*int D2::*piD21=&D2::mw22;*

In one embodiment of the present invention, five fields are used to represent pointer piD21 as shown by data structure 605. The field corresponds to one mdisp field and two sets of pdisp and vdisp fields. In general, one set of pdisp and vdisp field is needed to represent every virtually inherited base in a branch of the inheritance tree. Thus, the space needed to represent a pointer is not bounded, that is, it grows as classes with virtually inherited bases are virtually inherited. The first field 6051 is an mdisp field and contains the offset of data member W2::mw22 within the occurrence of class W2. The second and third fields 6052–6053 correspond to an pdisp and an vdisp field, which contain information to determine the offset of the virtual base table pointer A2::vbptr for class A2. The fourth and fifth fields 6052 also correspond to an pdisp and an vdisp field, which contain information to determine the offset of the occurrence of class W2 from the occurrence of class A2. In this embodiment, a set of pdisp and vdisp fields is needed for each virtual base class in a branch of the inheritance tree. Thus, the size of a pointer to a member is unbounded. The dereferencing of pointer piD21 is logically equivalent to the following statements, where &a represents the address of an object a of type class D2, pdisp1 and vdisp1 are the first set of fields, pdisp2 and vdisp2 are the second set of fields, and x holds the address of B2::vbptr.

*x=(&a+\*(\*(&a+pdisp1)+vdisp1)+pdisp2) address=x+\*(\*x+vdisp2)+mdisp*

Figure 7:
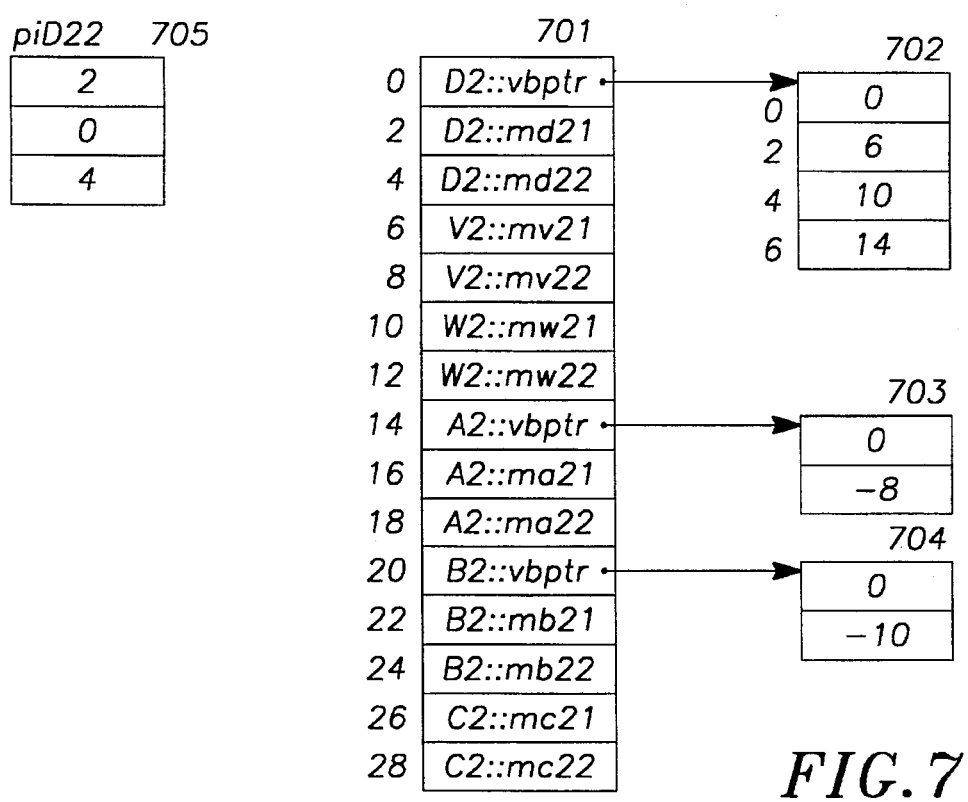
FIG. 7 is a schematic diagram of the data structure for a derived class that virtually inherits a base class that has a virtually inherited base class when a pointer is bounded in space.

In a preferred embodiment of the present invention, the size of a pointer to member is bounded in space. By extending the virtual base table for the derived class to include an offset to the occurrence of each base class that is either directly or indirectly virtually inherited, the pointers can be represented with three fields. FIG. 7 is a schematic diagram of class D2 in a preferred embodiment. Data structure 701 and virtual base tables 703 and 704 are identical to the corresponding structures in FIG. 6. Virtual base table 702 has, however, been extended to include 4 entries, that is, one entry for the offset of the derived class and one entry for each virtual base class that class D2 directly or indirectly inherits. The first entry is the offset of the derived class; the second entry contains the offset of the occurrence of class V2 within class D2; the third entry contains the offset of the occurrence of class W2 within class D2; and the fourth entry contains the offset of the occurrence of class C2 within class D2.

Pointer piD22 is declared to be a pointer to an integer data member of class D2 and initialized to point to data member D2::mw22 with the following statement.

*int D2::*piD22=&D2::mw22;*

The data structure 705 for pointer piD21 contains only three fields. Because virtual base table 702 contains the offset of each virtual base, one set of pdisp and vdisp fields are sufficient to determine the location of the occurrence of each virtual base. Consequently, it is preferred that the virtual base table for a derived class include the offset of each virtually inherited class.

Although in the preferred embodiment class data structures are implemented using virtual base tables that are shared by all objects of the class, alternate implementations may not use virtual base tables. Nevertheless, the methods of the present invention may be used with implementations that do not use virtual base tables. Some implementations may include within each derived base an offset or pointer to each virtual base class that is directly inherited.

FIG. 8 shows a schematic diagram of a data structure for class D2 that does not use virtual base tables. Data structure 801 for class D2 contains the offset 802 of the virtual base class C2 that is directly inherited. The occurrence of class A2 contains the offset 803 of the occurrence of the virtual base class V2 that class A2 directly inherits. Similarly, the occurrence of class B2 contains the offset 804 of the occurrence of the virtual base class W2 that class B2 directly inherits. Pointers to data members can be represented by sets of two fields. The first field is mdisp and the second field is qdisp, which contains the offset of the start of the offsets of the virtually inherited bases. However, the pointer size is not bounded in space for the same reasons as discussed above with respect to FIG. 6.

FIG. 9 shows a schematic diagram of a data structure for class D2 for a implementation that does not use virtual base tables. To ensure bounded pointer dereferencing and to ensure a bounded space representation for a pointer, each derived class contains a pointer to each directly and indirectly virtually inherited base class. Thus, data structure 901 contains the offset of the derived class 905 and the offsets 906, 907, 908 of the occurrences of virtual base classes V2, W2, and C2. The occurrence of class A2 contains an offset to the occurrence of class V2. The occurrence of class B2 contains an offset to the occurrence of class W2. Pointer piD23 is declared to be a pointer to an integer data member of class D2 and initialized to point to data member D2::mw22 in the following statement.

int D2::*piD23=&D2::mw22;

Data structure 902 for pointer piD23 contains the mdisp value 2, which is the offset of W2::mw22 within the occurrence of class W2, and the qdisp value 4, which is the offset 907 into class D2 that contains the value 16, which is the offset of the occurrence of class W2 within class D2. Pointer piD23 is dereferenced in the following statement, where &a is the address of the object.

&a+\*(&a+qdisp)+mdisp

To address members that are not virtually inherited, each class includes the offset of the derived class. Pointer piD24 is declared to be a pointer to an integer member of class D2 and initialized to point to data member D2::md22 in the following statement.

int D2::*piD24=&D2::md22;

Data structure 903 for pointer piD22 903 contains the mdisp value 10, which is the offset of D2::md22 within class D2, and the qdisp value 0, which is the offset within class D2 that contains the offset of the derived class.

FIGS. 8 and 9 describe an implementation using offsets, however, as discussed above, similar data structures would be generated by an implementation using pointers, rather than offsets. For example, if data structure 901 was stored at location 100, then pointer 905 would contain 100, pointer 906 would contain 112, pointer 907 would contain 116, etc.

Pointers to Function Members

The present invention represents a pointer to a function member by data to determine the address of the function and data indicating the this pointer that is to be passed to the function. In a preferred embodiment, a pointer to a function member is represented by the following four fields.

| | |
|---|---|
| faddr | address of the function or address of a thunk which invokes the function |
| fdisp | offset within the class that introduces the function of the this pointer for the function |
| pdisp | offset of the pointer to the virtual base table within the derived class |
| vdisp | offset of the entry in the virtual base table that contains the offset of the occurrence of the class that introduces the function within the derived class |

Referring to classes V1, A1, and B1 as defined above and shown in FIG. 4, the following statements define pointers pfA11 and pfB11, which are pointers to function members.

```
int (A1::*pfA11)( )=&V1::fv11;                    (10)

int (B1::*pfB11)( )=&B1::fb11;                    (11)

pB1=&b;                                            (12)

pA1=pB1;                                           (13)

c=(pA1→*pfA11)( );                                 (14)
```

In statement (10), pointer pfA11 is declared to be a pointer to integer function member of class A1 and is initialized to point to function member V1::fv11 that is inherited from class V1. Data structure 413 for pointer pfA11 is initialized to contain the address of function member V1::fv11 and the three fields fdisp, pdisp, and vdisp to indicate the this pointer location for the function. In statement (11), pointer pfB11 is declared to be a pointer to an integer function member of class B1 and is initialized to point to function member B1::fb11. Data structure 414 for pointer pfB11 contains the address of function member B1::fb11 and the three fields fdisp, pdisp, and vdisp to indicate the pointer location for the function. In statement (12), pointer pB1 is set to contain the address of object b. In statement (13), pointer pa1 is set to point to the address of the occurrence of an object of class A1 that is type cast from object b. In statement (14), the function V1::fv11 is invoked for the instance of class A1 that is cast from object b. Before invoking function V1::fv11, the this pointer is calculated using the pdisp, vdisp, and fdisp fields of pointer pfA11. The method for calculating the this pointer is analogous to the dereferencing of a pointer to a data member, except that field mdisp is replaced by field fdisp. The setting of the this pointer is logically equivalent to the following statement.

*this=pA1+\*(\*(pA1+pfA11.pdisp)+pfA11.vdisp)+pfA11.fdisp;*

Referring to the example of FIG. 4, object b 406 is located at memory location 100 and virtual base table 405 is located at memory location 200, the above statement retrieves the value of 100 from pA1 adds to it the value of 0 from field pdisp to give the value of 100, which is the address of the virtual base table pointer. The value of 200 from the virtual base table pointer is added to the value of 2 from field vdisp to give the value of 202, which is the address of the entry within the virtual base table that contains the offset of the occurrence of class V1 within class B1. Class V1 introduces virtual function V1::fv11. The value of 10 from the entry is added to the value 100 from pointer pA1 to give the value 110, which is the address of the occurrence of class V1 within object b. The this pointer is then set to the value 110 plus the value 0 from field fdisp, which is the offset of the occurrence of the this pointer for function V1::fv11 within class V1.

Figure 10:
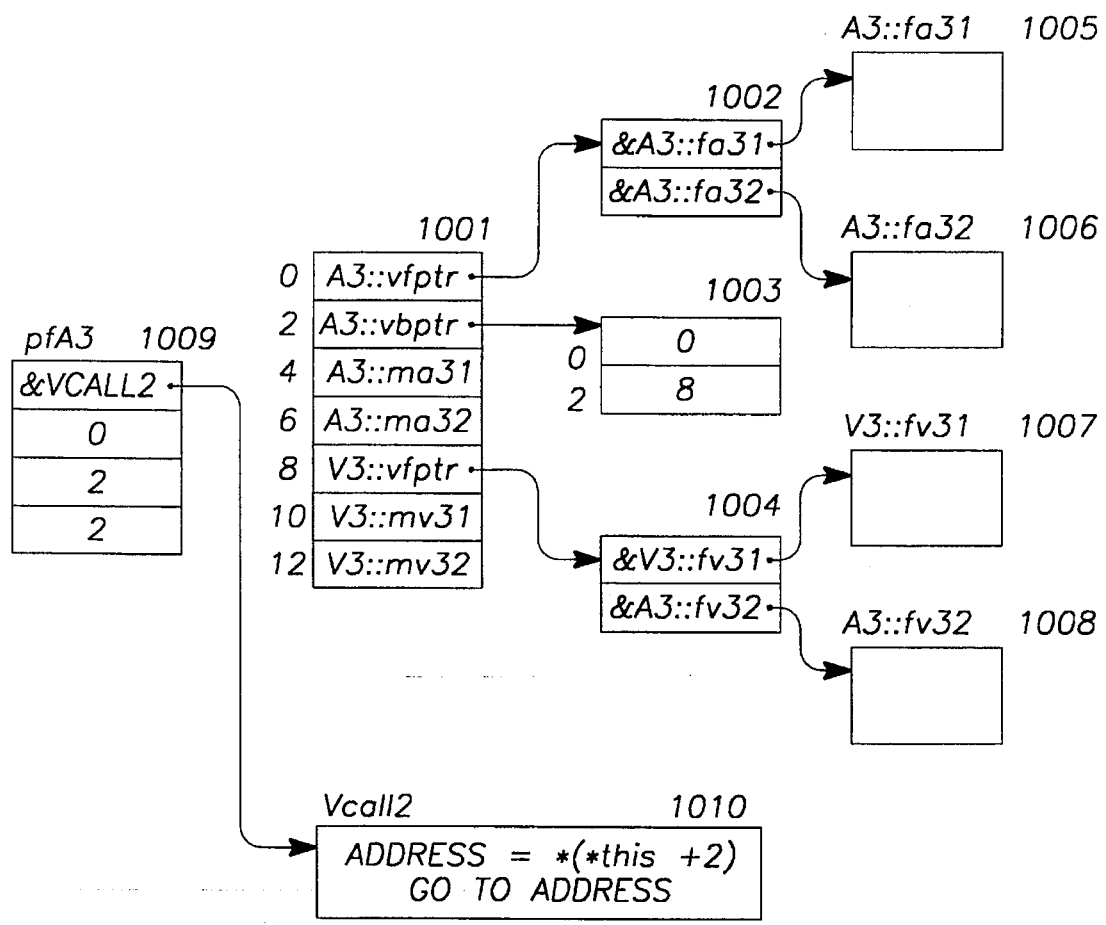
FIG. 10 is schematic diagram of the data structures that support pointers to function members.

When the function member is non-virtual, then the field faddr contains the address of the function. However, when the function member is virtual, then the field faddr contains the address of a thunk. The thunk determines the address of the virtual function member through the virtual function table and invokes the function. FIG. 10 is schematic diagram of the data structures for class A3. Class A3 virtually inherits class V3 and overrides virtual function V3::fv32 defined in class V3.

```
class V3
    {   int  mv31;
        int  mv32;
        virtual  int  fv31( );
        virtual  int  fv32( );
    };
class A3 : virtual V3
    {   int  ma31;
        int  ma32;
        virtual  int  fv32( );
        virtual  int  fa31( );
        virtual  int  fa32( );
    };
```

Data structure 1001 for class A3 contains the virtual function table pointer A3::vfptr, which points to virtual function table 1002; the virtual base table pointer A3::vbptr, which points to the virtual base table 1003; the data members of class A3; and an occurrence of class V3. The occurrence of class V3 includes virtual function table pointer V3::vfptr, which points to the virtual function table 1004, and the data members of class V3. Virtual function table 1002 contains the addresses of the virtual functions A3::fa31 1005 and A3::fa32 1006, which are introduced in class A3. Virtual function table 1004 contains the address of virtual function V3::fv31 1007, which is introduced in class V3, and the address of the virtual function A3::fv32 1008, which overrides the virtual function V3::fv32 introduced in class V3.

Pointer pfA3 is declared as a pointer to an integer function of class A3 and is initialized to point to function A3::fv32 in the following statement.

int (A3::\*pfA3)( )=&A3::fv32;

Data structure 1009 for pointer fpA3 contains field faddr, which contains the address of thunk Vcall2; field fdisp, which contains a 0; field pdisp, which contains the value 2 that is the offset of the virtual base pointer A3::vbptr within class A3; and field vdisp, which contains the value 2 that is the offset of the entry in the virtual base table that contains the offset of the occurrence of class V3 within class A3. Thunk Vcall2 1010 is passed the this pointer for function A3::fv31 and invokes the function. Thunk Vcall2 1010 determines the address of the function pointed to by the second entry in the virtual function table 1004 and invokes that function. Thunk Vcall2 determines the address of the function by the following statement.

ADDRESS=*(*this+2);

Recall that the this pointer points to the virtual function table pointer, as specified above when the class has a virtual function table. Thus, thunk Vcall2 is used to invoke any virtual function whose address is at offset 2 within a virtual function table. In a preferred embodiment, a thunk, such as Vcall2, is defined for each entry in a virtual function table. For example, a thunk Vcall0 would be defined to invoke the function accessed through the first entry in a virtual function table and a thunk Vcall8 would be defined to invoke the function whose address is at offset 8 within any virtual function table. These thunks can preferably be shared by all pointers to virtual function members for classes that virtually inherit a base class.

In an alternate embodiment of the present invention, the offsets in the virtual base table are stored relative to the virtual base table pointer. This method has the advantage of reducing the temporary storage needed when dereferencing pointers to members. In FIG. 10, virtual base table 1001 would contain −2 and 6, rather than 0 and 8. With this method, the value of the derived class offset is no longer 0 in all cases, but depends on the location of the virtual base table pointer within the class.

Although the present invention has been described in terms of preferred embodiments, it is not intended that the invention be limited to these embodiments. Modifications within the spirit of the invention will be apparent to those skilled in the art. For example, the ordering of the fields that compose a pointer to member can be changed. Also, the ordering of the offsets within the virtual base tables can be changed. The scope of the present invention is defined by the claims that follow.

We claim:

1. A method in a computer system for invoking virtual function members of classes, the method comprising the computer-implemented steps of:

allocating a virtual function table for each of the classes, each virtual function table having entries that are ordered from a first entry to a last entry, each entry containing a reference to a virtual function member of the class for which the table is allocated;

generating a thunk corresponding to each ordered entry of the allocated virtual function tables, the thunk for receiving a reference to an object of a class and for invoking the virtual function member of the class referenced by the corresponding ordered entry of the allocated virtual function table for the class; and for each invocation of a virtual function member of a class,
   invoking a thunk that corresponds to the ordered entry of the allocated virtual function table for the class at which the reference to the virtual function member is stored, wherein the thunk retrieves the reference to the virtual function member and transfers control to the virtual function member and wherein the thunks are shared by the classes.

2. The method of claim 1 wherein the object includes a pointer to the allocated virtual function table for the class and wherein the thunk retrieves the pointer to the allocated virtual function table for the class from the object.

3. The method of claim 1 wherein one of the allocated virtual function tables has a number of ordered entries that is greatest and the step of generating a thunk corresponding to each ordered entry, generates a thunk for each of the number of ordered entries that is greatest.

4. A method in a computer system for invoking a virtual function member of one of a plurality of classes, each class having a virtual function table, each virtual function table having ordered entries, each ordered entry containing a reference to a virtual function member of the class, each ordered entry having a thunk corresponding to the ordered entry, the method comprising the computer-implemented steps of:

retrieving a reference to an object of a class;

retrieving a reference to a thunk that corresponds to the ordered entry of the virtual function table of the class of the object that contains the reference to the virtual function member to be invoked;

invoking the thunk referenced by the retrieved reference to the thunk and passing to the thunk the retrieved reference to the object;

under control of the invoked thunk,
   retrieving the reference corresponding to the virtual function member to be invoked from the ordered entry of the virtual function table of the class that corresponds to the thunk; and
   transferring control from the thunk to the virtual function member referenced by the retrieved reference to the virtual function member to be invoked and passing to the virtual function member the retrieved reference to the object; and under control of the virtual function member, returning from the virtual function member.

5. A method in a computer system for generating a virtual base table for a derived class that virtually inherits a base class, the derived class having members, the method comprising the steps of:

allocating a virtual base table with an entry for the base class and an entry for the derived class;

setting the entry for the base class to refer to an occurrence of the base class within an object of the derived class; and setting the entry for the derived class to refer to the object of the derived class wherein when generating a reference to a member of the derived class, the reference is generated to access the member through the virtual base table so that when the derived class is virtually inherited by a further derived class, the generated reference can access the occurrence of the derived class in the further derived class through the virtual base table of the further derived class.

6. A method in a computer system for generating pointers to data members of base classes that are virtually inherited by a derived class, comprising the computer-implemented steps of:

allocating a virtual base table for the derived class that contains a reference to an occurrence within the derived class of each direct and indirect base class that is virtually inherited; and for each pointer to a data member of an occurrence of a virtually inherited base class within the derived class,
   allocating an occurrence indicator for indicating the reference within the virtual base table to the occurrence of the virtually inherited base class within the derived class; and
   allocating an offset indicator for indicating a position of the data member within the occurrence of the virtually inherited base class within the derived class
   wherein the pointer is dereferenced by using the occurrence indicator to locate the occurrence of the virtually inherited base class within the derived class and using the offset indicator for locating the position of the data member within the occurrence of the virtually inherited base class within the derived class.

7. The method of claim 6 further including the step of for each pointer to a data member of an occurrence of a virtually inherited base class within the derived class, allocating an virtual base indicator for indicating a position within the derived class of the virtual base table.

8. A method in a computer system for generating pointers to function members of base classes that are virtually inherited by a derived class, comprising the computer-implemented steps of:

allocating a virtual base table for the derived class that contains a reference to an occurrence within the derived class of each direct and indirect base class that is virtually inherited; and for each pointer to a function member of an occurrence of a virtually inherited base class within the derived class, allocating a virtual function member indicator for indicating a position of the virtual function member within a virtual function table for the virtually inherited base class;

allocating an occurrence indicator for indicating the reference within the virtual base table to the occurrence of the virtually inherited base class within the derived class; and allocating an offset indicator for indicating a position of a this pointer within the occurrence of the virtually inherited base class within the derived class wherein the pointer to the function member is dereferenced by using the occurrence indicator to locate the occurrence of the virtually inherited base class within the derived class, using the offset indicator for setting the this pointer within the occurrence of the virtually inherited base class within the derived class.

9. A computer-readable storage device containing instructions for controlling a computer system to invoke a virtual function member of one of a plurality of classes, each class having a virtual function table, each virtual function table having ordered entries, each ordered entry containing a reference to a virtual function member of the class, each ordered entry having a thunk corresponding to the ordered entry, the virtual function member of one of a plurality of classes invoked by the steps of:

retrieving a reference to an object of a class;

retrieving a reference to a thunk that corresponds to the ordered entry of the virtual function table of the class of the object that contains the reference to the virtual function member to be invoked;

invoking the thunk referenced by the retrieved reference to the thunk and passing to the thunk the retrieved reference to the object;

under control of the invoked thunk,
retrieving the reference corresponding to the virtual function member to be invoked from the ordered entry of the virtual function table of the class that corresponds to the thunk; and transferring control from the thunk to the virtual function member referenced by the retrieved reference to the virtual function member to be invoked and passing to the virtual function member the retrieved reference to the object; and under control of the virtual function member, returning from the virtual function member.

10. A computer-readable storage device containing instructions for controlling a computer system to generate pointers to data members of base classes that are virtually inherited by a derived class by the steps of:

allocating a virtual base table for the derived class that contains a reference to an occurrence within the derived class of each direct and indirect base class that is virtually inherited; and for each pointer to a data member of an occurrence of a virtually inherited base class within the derived class, allocating an occurrence indicator for indicating the reference within the virtual base table to the occurrence of the virtually inherited base class within the derived class; and allocating an offset indicator for indicating a position of the data member within the occurrence of the virtually inherited base class within the derived class wherein the pointer is dereferenced by using the occurrence indicator to locate the occurrence of the virtually inherited base class within the derived class and using the offset indicator for locating the position of the data member within the occurrence of the virtually inherited base class within the derived class.

11. The computer-readable storage device of claim 10 further including the step of for each pointer to a data member of an occurrence of a virtually inherited base class within the derived class, allocating an virtual base indicator for indicating a position within the derived class of the virtual base table.

12. A computer-readable storage device containing instruction for controlling a computer system to generate pointers to function members of base classes that are virtually inherited by a derived class by the steps of:

allocating a virtual base table for the derived class that contains a reference to an occurrence within the derived class of each direct and indirect base class that is virtually inherited; and for each pointer to a function member of an occurrence of a virtually inherited base class within the derived class, allocating a virtual function member indicator for indicating a position of the virtual function member within a virtual function table for the virtually inherited base class;

allocating an occurrence indicator for indicating the reference within the virtual base table to the occurrence of the virtually inherited base class within the derived class; and allocating an offset indicator for indicating a position of a this pointer within the occurrence of the virtually inherited base class within the derived class wherein the pointer to the function member is dereferenced by using the occurrence indicator to locate the occurrence of the virtually inherited base class within the derived class, using the offset indicator for setting the this pointer within the occurrence of the virtually inherited base class within the derived class.

* * * * *